(12) United States Patent
Calota et al.

(10) Patent No.: US 8,958,523 B2
(45) Date of Patent: Feb. 17, 2015

(54) SPACER GRID

(75) Inventors: Elena Calota, Vasteras (SE); Lars Hallstadius, Vasteras (SE); Mats Dahlback, Vasteras (SE); Carina Onneby, Vasteras (SE); Britta Helmersson, Vasteras (SE)

(73) Assignee: Westinghouse Electric Sweden AB, Vasteras (SE)

( * ) Notice: Subject to any disclaimer, the term of this patent is extended or adjusted under 35 U.S.C. 154(b) by 936 days.

(21) Appl. No.: 12/993,703

(22) PCT Filed: May 20, 2009

(86) PCT No.: PCT/SE2009/050579
§ 371 (c)(1),
(2), (4) Date: Nov. 19, 2010

(87) PCT Pub. No.: WO2009/145708
PCT Pub. Date: Dec. 3, 2009

(65) Prior Publication Data
US 2011/0064185 A1    Mar. 17, 2011

(30) Foreign Application Priority Data
May 28, 2008    (SE) ........................................ 0801249

(51) Int. Cl.
*G21C 3/34*    (2006.01)
(52) U.S. Cl.
CPC ................ *G21C 3/34* (2013.01); *G21C 3/3424* (2013.01); *G21Y 2002/103* (2013.01); *Y02E 30/40* (2013.01)
USPC ....................................................... 376/462

(58) Field of Classification Search
USPC ......................................................... 376/462
See application file for complete search history.

(56) References Cited

U.S. PATENT DOCUMENTS

| | | | |
|---|---|---|---|
| 3,769,159 A | 10/1973 | Zinn et al. | |
| 4,844,864 A | 7/1989 | Frank | |
| 4,877,465 A | 10/1989 | Donati et al. | |
| 5,400,373 A | 3/1995 | Cotton | |
| 5,556,594 A * | 9/1996 | Frank et al. | .................. 420/448 |
| 6,501,813 B1 | 12/2002 | Soma | |

(Continued)

FOREIGN PATENT DOCUMENTS

| | | |
|---|---|---|
| EP | 1 312 688 A1 | 5/2003 |
| EP | 1 647 609 A1 | 4/2006 |

(Continued)

OTHER PUBLICATIONS

European Patent Office, Supplementary European Search Report for European Application No. 09755146.9-2208 dated Mar. 13, 2012.

(Continued)

*Primary Examiner* — Timothy A Brainard
(74) *Attorney, Agent, or Firm* — Moore & Van Allen PLLC

(57) ABSTRACT

The invention relates to a final, ready to use, spacer grid for a nuclear boiling water reactor. The final spacer grid comprises: i) a spacer grid structure made of an alloy that has been formed and assembled such that it constitutes a spacer grid, and ii) an outer oxide coating on the surface of the spacer grid structure. Said alloy is a Ni base alloy that consists of the following: (table) The invention also relates to a method of manufacturing the final spacer grid according to the invention.

13 Claims, 2 Drawing Sheets

(56) References Cited

U.S. PATENT DOCUMENTS

| | | | |
|---|---|---|---|
| 2002/0061089 A1* | 5/2002 | Garzarolli et al. | 376/416 |
| 2004/0103963 A1* | 6/2004 | Miyahara et al. | 148/675 |
| 2004/0221925 A1* | 11/2004 | Tamaki et al. | 148/410 |
| 2005/0220261 A1* | 10/2005 | Kreuter et al. | 376/443 |
| 2010/0116383 A1* | 5/2010 | Cloue et al. | 148/675 |

FOREIGN PATENT DOCUMENTS

| | | |
|---|---|---|
| JP | S57-169052 | 10/1982 |
| JP | S63-018032 | 1/1988 |
| JP | 05 164886 | 12/1991 |
| JP | 07 228963 | 8/1995 |
| JP | H07-228963 | 8/1995 |
| JP | 08029571 A * | 2/1996 |
| JP | H08-029571 | 2/1996 |
| JP | 09 324233 | 12/1997 |
| JP | 2002-173720 | 6/2002 |
| JP | 2002-173721 | 6/2002 |
| JP | 2004 251871 A | 9/2004 |
| TW | 265446 | 12/1995 |
| TW | 429380 | 4/2001 |
| WO | WO 2008081118 A2 * | 7/2008 |

OTHER PUBLICATIONS

The International Bureau of WIPO, PCT International Preliminary Report on Patentability and Written Opinion of the International Search Authority for International Application No. PCT/SE2009/050579 dated Nov. 30, 2010.

Taiwan Patent Office, English Translation of Taiwan Application No. 098116853 Office Action dated Nov. 20, 2013, pp. 1-6.

Japanese Patent Office, Japanese Application No. 2011-511563 Office Action dated Oct. 8, 2013, pp. 1-4.

* cited by examiner

SPACER GRID

CROSS-REFERENCE TO RELATED APPLICATIONS

This application is filed under the provisions of 35 U.S.C. §371 and claims the benefit of International Patent Application No. PCT/SE2009/050579, filed on May 20, 2009 entitled "A Spacer Grid" in the name of Elena Calota, et al., which claims priority of Swedish Patent Application No. 0801249-4, filed on May 28, 2008, both of which are hereby incorporated by reference herein in their entirety.

BACKGROUND OF THE INVENTION AND PRIOR ART

The present invention concerns a final, ready to use, spacer grid configured to separate and hold nuclear fuel rods in a nuclear reactor of the boiling water reactor (BWR) type in predetermined positions relative to each other.

A nuclear boiling water reactor comprises a core having a plurality of fuel assemblies. Each fuel assembly includes a plurality of fuel rods and each fuel rod comprises nuclear fuel enclosed by a cladding. The fuel rods are held in predetermined positions relative one another with the help of a number of axially distributed spacer grids, each spacer grid consisting of a lattice structure with a number of cells through which the fuel rods extend.

The environment in the core of a nuclear BWR is demanding for the components positioned therein. The environment is highly oxidative. A spacer grid must for example withstand the following circumstances: a two phase flow of steam and water at a temperature of about 286° C., wherein the flow of the steam is 10 m/s and the pressure is 70 bar. There are water droplets in the steam and an oxygen content and hydrogen peroxide content in the environment of 0.4 ppm and <1 ppm, respectively. The spacer grid is also exposed to strong radiation.

Spacer grids are often produced from thin metallic plates of zirconium alloys or Ni base alloys. A well-known Ni base alloy is called X-750. Alloy X-750 has been used for BWR spacer grids with considerable success for more than 30 years. A drawback with spacer grids made from alloy X-750 is however that a relatively high corrosion rate in some reactors, due to the specific environment described above, results in general corrosion of the spacer grid surface. The general corrosion of the spacer grid may lead to a release of $^{58}Co$ into the reactor water. $^{58}Co$ is an isotope of Co and it deposits onto surfaces in the nuclear reactor. $^{58}Co$ is mainly formed through neutron activation of $^{58}Ni$. Furthermore, another isotope of Co, $^{60}Co$, is formed by neutron activation of the common isotope $^{59}Co$. Both $^{58}Co$ and $^{60}Co$ are radioactive isotopes and the release of these radioactive isotopes into the reactor water results in an increased risk for exposure of staff working at the nuclear reactor plant.

The term "Ni base alloy" does in this context mean that the principal element in the alloy is Ni. No other element is present in a greater amount. A Ni base alloy has a matrix made up of Ni with other elements such as Cr and Fe in solution. By heat treatment of the alloy so called γ' secondary phase particles may be formed by changes in solid solubility with temperature. The fine γ' secondary phase particles prevent the movement of dislocations, or defects, in the matrix of the alloy, thereby increasing the mechanical strength of the material. The γ' secondary phase particles in a Ni base alloy are normally $Ni_3(Ti,Al)$.

JP 09-324233 A describes a Ni base alloy of high strength stated to have an improved resistance against stress corrosion cracking (SCC). The alloy is especially intended to be used in components such as springs, bolts and pins inside the high temperature hot water environment of a nuclear BWR or a nuclear PWR (pressurized water reactor). The alloy is similar to alloy X-750. JP 09-324233 A does however state a higher amount of Fe compared to alloy X-750. By increasing the amount of Fe, JP 09-324233 A states that an improved SCC resistance is obtained.

Stress corrosion cracking of a metal occurs due to a constant tensile stress of the metal in a corrosive environment, especially at elevated temperatures. Stress corrosion usually leaves most of the surface of a component unattacked, but takes place at the positions that are exposed to the constant tensile stress. Fine cracks are formed in the material and the cracking may lead to an unexpected sudden failure of the metal. Springs, bolts and pins inside the high temperature hot water environment of a nuclear BWR or a nuclear PWR are, as described in JP 09-324233 A, examples of components that are subjected to SCC.

In the core of a nuclear BWR general corrosion may occur, which may result in an undesired release of radioactive Co isotopes as described above. General corrosion is a particular problem in the core of the reactor due to the particular conditions that exist there. General corrosion can take place all over the surface of a component, the corrosion being characterised by a uniform attack. Since a spacer grid is positioned inside the core of the reactor, it is particularly subjected to general corrosion.

As mentioned above, a drawback with spacer grids made from alloy X-750 is that the relatively high corrosion rate in some reactors leads to general corrosion on the surface of the spacer grid. There is therefore a desire to improve the corrosion resistance of the spacer grid.

SUMMARY OF THE INVENTION

A purpose of the present invention is to improve the corrosion resistance of a spacer grid in a nuclear boiling water reactor and, hence, reduce the problems of general corrosion as described above, resulting in lower release levels of radioactive Co isotopes into the reactor water. Another purpose of the invention is to provide a method of producing a spacer grid with improved corrosion resistance.

The first purpose is obtained with the initially defined final spacer grid, which is characterised in that the final spacer grid comprises:
   i) a spacer grid structure made of an alloy that has been formed and assembled such that it constitutes a spacer grid, and
   ii) an outer oxide coating on the surface of the spacer grid structure,
wherein said alloy is a Ni base alloy that consists of the following:

| Element | % by weight |
|---|---|
| Ni | >45.0 |
| Cr | 13.0-26.0 |
| Fe | 10.0-30.0 |
| Ti | 1.0-4.0 |
| Al | 0.30-2.0 |
| Co | 0-0.040 |
| C | 0-0.10 |
| N | 0-0.10 |
| Nb + Ta | 0.20-2.0 |

-continued

| Element | % by weight |
|---|---|
| Si | 0-2.0 |
| Mn | 0-2.0 |
| S | 0-0.050 |
| P | 0-0.10 |
| Cu | 0-2.0 |
| Mo + W | 0-3.0 |
| the total amount of one or more elements chosen from the group consisting of all elements except for the elements referred to in the table above | 0-2.0 |

The expression "spacer grid structure" is in this context intended to describe a metal lattice frame that is formed as a spacer grid but that has not yet undergone a final heat treatment. Furthermore, the expression "final spacer grid" is in this context intended to describe a heat treated, ready to use, spacer grid structure.

The final spacer grid according to the invention is made of a Ni base alloy similar to alloy X-750. The present Ni base alloy does however contain an increased amount of Fe. The outer oxide coating on the final spacer grid is crucial for the general corrosion resistance during operation. The outer oxide coating according to the prior art normally comprises an outer layer of a Ni rich oxide. This Ni rich oxide substantially comprises a pure Ni oxide but also a small amount of a mixed Ni—Fe oxide. It has been found that with the alloy used for the present invention it is easier to obtain the mixed Ni—Fe oxide during a final heat treatment. The reason for this is due to the specific alloy composition used, which comprises an increased amount of Fe. The mixed Ni—Fe oxide has been shown to be more resistant against corrosion than the pure Ni oxide, and it has been found that the final spacer grid according to the present invention has an improved corrosion resistance. In particular it has an improved resistance against general corrosion in the specific environment that exists in the core of a nuclear BWR.

It is to be noted that if nothing else is stated, "%" always refers to % by weight in this document.

Preferably, the Ni base alloy contains Ni in an amount of more than 50%, more preferred more than 60%. Ni is a matrix forming element and participates in the formation of γ' ($Ni_3$(Ti,Al)) secondary phase particles. Ni also participates in the formation of $NiFe_2O_4$, an oxide layer which provides corrosion resistance.

Preferably, the Ni base alloy contains Cr in an amount of 14-21%, more preferred 14-17%. Cr provides corrosion resistance through the formation of chromium oxide during pre-oxidation and also by the formation of a passive film during corrosion. A too high Cr content results in increasing risks of formation of embrittling phases.

Preferably, the Ni base alloy contains Fe in an amount of 12-23%, more preferred 15-19%. Fe is a matrix forming element and may participate in the formation of γ' ($Ni_3$(Ti,Al)) secondary phase particles by replacing a minor amount of Ni. Fe is also a necessary component in the mixed Ni—Fe oxide layer which provides corrosion resistance, as described above. A relatively high Fe content is required in order to form an outer oxide layer that is predominantly composed of $NiFe_2O_4$.

Preferably, the Ni base alloy contains Ti in an amount of 1.5-3%, more preferred 1.75-2.75%. Ti is a necessary element for the formation of γ' ($Ni_3$(Ti,Al)) secondary phase particles, which are necessary in order to obtain a sufficient mechanical strength in the heat treated condition. A too high Ti content will interfere with the formation of the outer oxide coating and also result in an increased tendency for overaging of γ' which can cause reduced mechanical strength. In addition, an increase in the Ti content increases the dissolution temperature for γ', which will increase the risk of γ' formation during alloy processing, in turn leading to the risk of the formation of cracking during hot or cold working of the alloy.

Preferably, the Ni base alloy contains Al in an amount of 0.5-1.5%, more preferred 0.4-1.0%. Al is a necessary element for the formation of γ' ($Ni_3$(Ti,Al)) secondary phase particles, which are necessary in order to obtain a sufficient mechanical strength in the heat treated condition. A too high Al content will result in an increased tendency for overaging of γ' which can cause reduced mechanical strength. In addition, an increase in the Al content increases the dissolution temperature for γ', which will increase the risk of γ' formation during alloy processing as described above.

Preferably, the Ni base alloy contains Co only in an amount of 0.0001-0.01%, more preferred 0.0001-0.0050%. Co is an unavoidable contaminant in a Ni metal. The common isotope $^{59}Co$ forms $^{60}Co$ under neutron irradiation. The formation of $^{60}Co$ is a severe problem in the operation of nuclear power plants and in the handling of spent nuclear fuel. Therefore, the amount of Co in the alloy should be controlled and kept low.

Normally, the Ni base alloy contains C in an amount of at least 0.001%. Preferably, the amount of C is 0.001-0.050%. C is an unavoidable contaminant in the Ni base alloy. A too high C content results in an increased sensitivity to intergranular corrosion.

Normally, the Ni base alloy contains N in an amount of at least 0.001%. Preferably, the amount of N is 0.001-0.03%. N is an unavoidable contaminant in the Ni base alloy. A too high N content results in an increased risk of the precipitation of embrittling nitrides, e.g. AlN. A too high N content in the melt also results in the formation of bulky TiN precipitates that are undesirable in the thin strip material used in the spacer production.

Preferably, the Ni base alloy contains Nb in an amount of 0.001-1.5%, more preferred 0.7-1.2%. Nb forms strengthening particles during heat treatment, and therefore contributes to the mechanical strength of the alloy. Nb also has a solution strengthening effect. A too high Nb content result in loss of hot ductility and in an increased tendency to segregation of alloying elements during casting.

Preferably, the Ni base alloy contains Ta in an amount of 0.001-0.03%. The properties of Ta are similar to those of Nb.

Normally, the Ni base alloy contains Si in an amount of at least 0.01%. Preferably, the amount of Si is 0.01-0.5%.

Normally, the Ni base alloy contains Mn in an amount of at least 0.01%. Preferably, the amount of Mn is 0.01-1.0%.

Si and Mn are examples of additives used in melt processing and casting. These additives are always found in the alloy. In order to avoid the risk of the formation of embrittling precipitates or in other ways affecting the alloy in a negative way, the Si and Mn content should not be too high.

Normally, the Ni base alloy contains S in an amount of at least 0.001%. Preferably, the amount of Si is 0.001-0.02%, more preferred 0.001-0.01%.

Normally, the Ni base alloy contains P in an amount of at least 0.001%. Preferably, the amount of P is 0.001-0.05%, more preferred 0.001-0.02%.

S and P are unavoidable impurities and their presence can result in reduced hot ductility during production.

Normally, the Ni base alloy contains Cu in an amount of at least 0.01%. Preferably, the amount of Cu is 0.01-0.5%. Cu is a contaminant typically present in Ni and Fe base alloys.

Normally, the Ni base alloy contains Mo and W in a total amount of at least 0.001%. Preferably, the amount of Mo+W is 0.001-1.0%, more preferred 0.001-0.20%. Mo and W are solid solution strengthening elements. They are not expected to have any positive effect on the corrosion resistance and only marginal effects on the mechanical strength.

The Ni base alloy may further contain a total amount of not more than 2.0% of one or more elements chosen from the group consisting of all elements except for the elements referred to in the table above. Preferably, the total amount of such elements is less than 1.0%, more preferred less than 0.5%, even more preferred less than 0.1%, and most preferred less than 0.05%. Such elements may for example be Ca, Mg and Ce, which are examples of inclusion forming elements used in deoxidisation or desulfurisation of the melt. If Ca, Mg and Ce are present in the Ni base alloy, the alloy preferably contains a total amount of these elements of 0.001-0.05%.

According to an embodiment of the invention, referring to the amounts of each element mentioned above, the Ni base alloy consists of the following:

| Element | % by weight |
| --- | --- |
| Ni | >50.0 |
| Cr | 14.0-21.0 |
| Fe | 12.0-23.0 |
| Ti | 1.50-3.0 |
| Al | 0.50-1.50 |
| Co | 0.0001-0.010 |
| C | 0.001-0.050 |
| N | 0.001-0.030 |
| Nb | 0.001-1.50 |
| Ta | 0.001-0.030 |
| Si | 0.01-0.50 |
| Mn | 0.01-1.0 |
| S | 0.001-0.020 |
| P | 0.001-0.050 |
| Cu | 0.01-0.50 |
| Mo + W | 0.001-1.0 |
| the total amount of one or more elements chosen from the group consisting of all elements except for the elements referred to in the table above | 0-1.0 |

According to a further embodiment of the invention, referring to the amounts of each element mentioned above, the Ni base alloy consists of the following:

| Element | % by weight |
| --- | --- |
| Ni | >60.0 |
| Cr | 14.0-17.0 |
| Fe | 15.0-19.0 |
| Ti | 1.750-2.750 |
| Al | 0.40-1.0 |
| Co | 0.0001-0.0050 |
| C | 0.001-0.050 |
| N | 0.001-0.030 |
| Nb | 0.70-1.20 |
| Ta | 0.001-0.030 |
| Si | 0.01-0.50 |
| Mn | 0.01-1.0 |
| S | 0.001-0.010 |
| P | 0.001-0.020 |
| Cu | 0.01-0.50 |
| Mo + W | 0.001-0.20 |
| the total amount of one or more elements chosen from the group consisting of all elements except for the elements referred to in the table above | 0-0.50 |

According to an embodiment, said alloy in the final spacer grid comprises a substantial amount of γ' secondary phase particles such that the final spacer grid has a sufficient mechanical strength. The γ' secondary phase particles prevent the movement of dislocations, or defects, in the matrix of the alloy, thereby increasing the mechanical strength of the material, as mentioned above.

Preferably, the mole fraction of γ' secondary phase particles in said alloy in the final spacer grid is 5-25%.

According to a further embodiment, said outer oxide coating has a thickness of 50-1000 nm. The outer oxide coating should not be too thick since this may lead to cracking of the material.

According to a further embodiment, said outer oxide coating comprises a first inner oxide layer of a first composition and a second outer oxide layer of a second composition different from the first composition. Preferably, the second outer oxide layer is formed on the surface of the first inner oxide layer. Preferably, the first inner oxide layer is formed directly on the surface of the alloy from which the spacer grid structure is made.

According to a further embodiment, the first inner oxide layer mainly consists of $Cr_2O_3$ and the second outer oxide layer mainly consists of $NiFe_2O_4$. The expression "mainly" does in this context mean that the layers consist of at least 50% $Cr_2O_3$ and at least 50% $NiFe_2O_4$, respectively. $Cr_2O_3$ slows down the metal cat ion diffusion and thereby reduces the total oxidation. $NiFe_2O_4$ protects the final spacer grid against corrosion in the special environment inside the fuel assembly.

According to a further embodiment, the first inner oxide layer has a thickness of 50-200 nm, preferably around 150 nm, and the second outer oxide layer has a thickness of 20-80 nm, preferably around 50 nm.

The second purpose of the invention is obtained with a method of manufacturing the initially defined final spacer grid, which is characterised in that the method comprises the steps of:

producing said alloy and forming and assembling the alloy such that said spacer grid structure is obtained, heat treating the spacer grid structure at a temperature of 650-750° C. for 5-23 hours, the heat treatment being performed in an oxidizing atmosphere, wherein the heat treatment is such that an outer oxide coating is formed on the surface of the spacer grid structure, thereby obtaining the final, ready to use, spacer grid.

Preferably, said heat treatment of the spacer grid structure is such that a first and a second oxide layer as defined above are formed.

Preferably, said oxidizing atmosphere comprises aqueous vapour and air.

Preferably, said heat treatment of the spacer grid structure is such that γ' secondary phase particles are formed in said alloy, thereby obtaining improved mechanical properties of the final spacer grid. As indicated above, γ' formation during alloy processing should be avoided. However, the presence of γ' secondary phase particles is important for the properties of the final spacer grid. Therefore, the method according to the present invention is preferably carried out such that no γ' secondary phase particles (or at least no substantial amount of such particles) are formed during the alloy processing. Instead, the method is carried out such that essentially all γ' secondary phase particles are formed during the final heat treatment, i.e. during the heat treatment of the spacer grid structure.

The above described heat treatment procedure gives excellent mechanical properties and produces an outer oxide coating, which coating provides the final spacer grid excellent protection against general corrosion in the core of the nuclear BWR.

SHORT DESCRIPTION OF THE DRAWINGS

DESCRIPTION OF EXAMPLES OF THE INVENTION

An example of a composition of a Ni base alloy used for making the final spacer grid according to the invention is given in the table below. In addition to the elements specified in the table, the alloy may further contain small amounts of impurities at a level that is normally accepted in alloys for use as spacer grids in nuclear reactors. The Ni base alloy is suitable for the manufacture of a final spacer grid according to the method described below.

Example

| Element | % by weight |
| --- | --- |
| Ni | 61.7 |
| Cr | 16.1 |
| Fe | 17.6 |
| Ti | 2.2 |
| Al | 0.50 |
| Co | <0.005 |
| C | 0.007 |
| N | 0.01 |
| Nb + Ta | 0.86 |
| Ta | <0.03 |
| Si | 0.39 |
| Mn | 0.56 |
| S | 0.002 |
| P | 0.004 |
| Cu | <0.01 |
| Ca + Mg + Ce | 0.01 |
| Mo + W | <0.01 |

Figure 1:
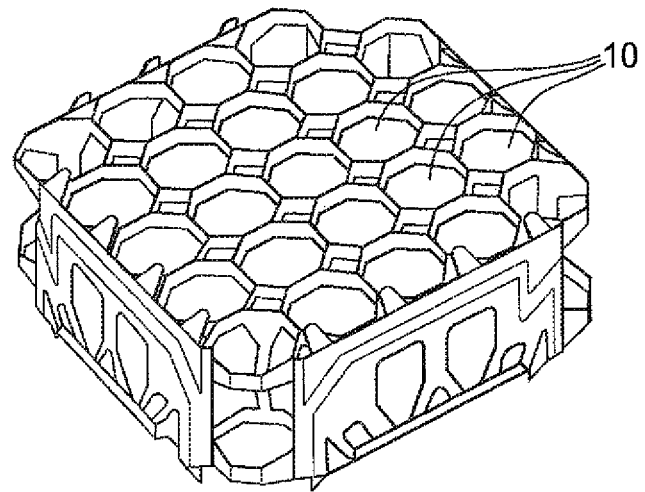
FIG. 1 shows schematically a final spacer grid according to the invention.

An embodiment of a final spacer grid according to the invention will now be described with reference to FIG. 1. The final spacer grid comprises a metal lattice. The metal lattice is a thin metal structure comprising a number of uniform cells 10. Each cell 10 is configured to enclose and hold a fuel rod in a predetermined position. When the final spacer grid is used in a nuclear BWR, the fuel rods extend through the cells 10 in a substantially vertical direction.

Final spacer grids according to the invention can be arranged inside fuel assemblies of a nuclear BWR. Each fuel assembly includes a plurality of fuel rods and each fuel rod comprises nuclear fuel enclosed by a cladding. A number of final spacer grids according to the invention hold the fuel rods in place. The final spacer grids are distributed axially along each fuel assembly. The final spacer grids according to this shown embodiment can be grouped in sets of 4 at the same level in the fuel assembly. However, the present invention also applies to spacer grids of other designs.

Figure 2:
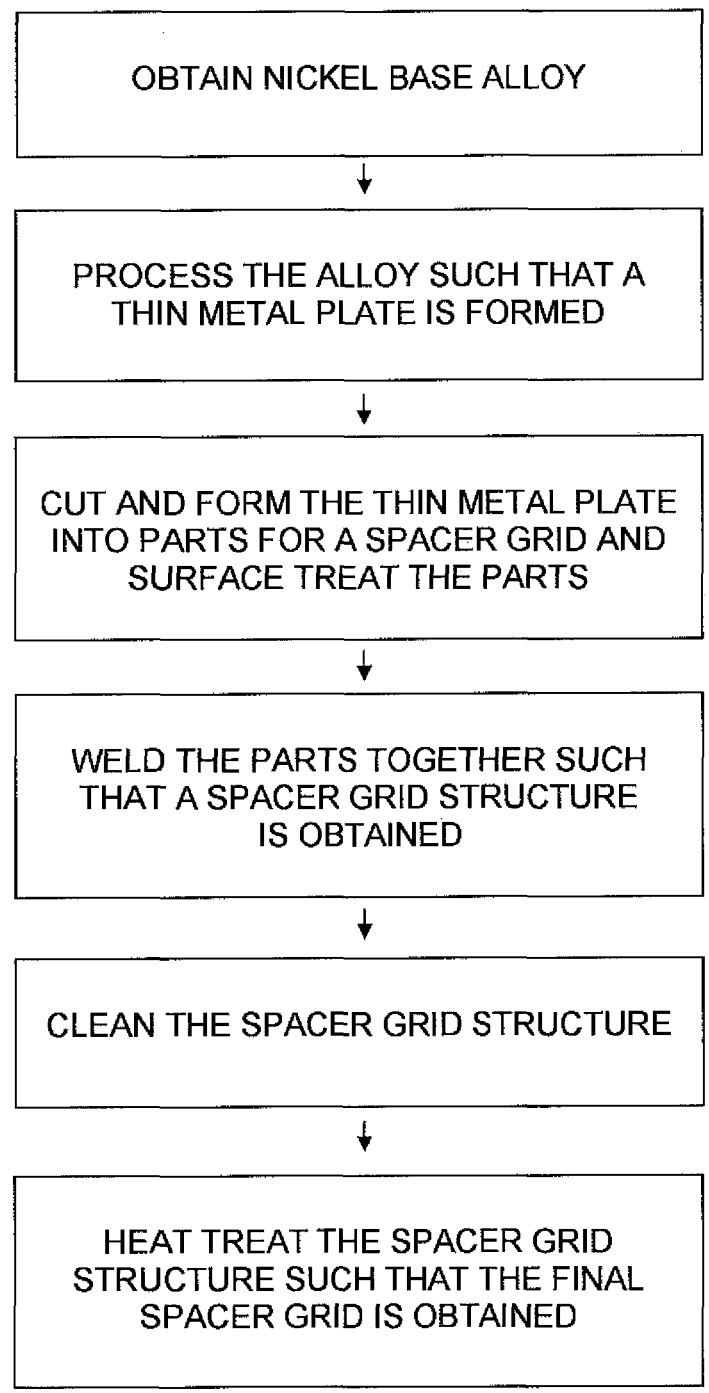
FIG. 2 is a flow chart for the method of manufacturing a final spacer grid according to an example of the present invention.

FIG. 2 is a flow chart illustrating the method of manufacturing a final spacer grid according to an example of the present invention. In a first step a Ni base alloy is obtained in a manner known to a person skilled in the art. An example of a Ni base alloy according to the invention is given in the table above. The alloy billet undergoes a number of working steps, which includes heat treatments and rolling, in a manner known to a person skilled in the art, such that a thin metal plate is obtained. The thin metal plate is cut and formed into parts for a spacer grid and the parts are surface treated, e.g. by pickling of the metallic surface. The parts are welded together such that a spacer grid structure is obtained. The spacer grid structure is cleaned.

Finally, the spacer grid structure is according to the present example heat treated at a temperature of 705° C. for 20 hours in an oxidizing atmosphere comprising aqueous vapor and air, obtaining the final spacer grid. The heat treatment is such that a first inner oxide layer with a thickness of about 150 nm and a second outer oxide layer with a thickness of about 50 nm are formed on the surface of the spacer grid structure. The first inner oxide layer substantially comprises $Cr_2O_3$ and is formed directly on the surface of the spacer grid structure. The second outer oxide layer substantially comprises $NiFe_2O_4$ and is formed on the surface of the first inner oxide layer. The heat treatment is also such that γ' secondary phase particles are formed in the alloy in a mole fraction of 11%. Thereby, improved mechanical properties of the spacer grid are obtained.

The present invention is not limited to the described embodiment but can be varied and modified within the scope of the following claims.

The invention claimed is:

1. A final, ready to use, spacer grid configured to separate and hold nuclear fuel rods in a nuclear reactor of the boiling water reactor type in predetermined positions relative to each other, wherein the final spacer grid comprises:
   i) a spacer grid structure made of an alloy that has been formed and assembled such that it constitutes a spacer grid, and
   ii) an outer oxide coating on the surface of the spacer grid structure, said outer oxide coating comprises a first inner oxide layer of a first composition and a second outer oxide layer of a second composition different from the first composition, wherein the first inner oxide layer mainly contains $Cr_2O_3$ and the second outer oxide layer mainly contains $NiFe_2O_4$;
   wherein said alloy is a Ni base alloy that consists of the following:

| Element | % by weight |
| --- | --- |
| Ni | >50.0 |
| Cr | 14.0-21.0 |
| Fe | 12.0-23.0 |
| Ti | 1.50-3.0 |
| Al | 0.40-1.50 |
| Co | 0.0001-0.010 |
| C | 0.001-0.050 |
| N | 0.001-0.030 |
| Nb | 0.001-1.50 |
| Ta | 0.001-0.030 |
| Si | 0.01-0.50 |
| Mn | 0.01-1.0 |
| S | 0.001-0.020 |
| P | 0.001-0.050 |
| Cu | 0.01-0.50 |
| Mo + W | 0.001-1.0 |
| the total amount of one or more elements chosen from the group consisting of all elements except for the elements referred to in the table above. | 0-1.0 |

2. A final spacer grid according to claim 1, wherein the amount of Fe in said alloy is 15.0-19.0% by weight.

3. A final spacer grid according to claim 1, wherein the amount of Co in said alloy is <0.0050% by weight.

4. A final spacer grid according to claim 1, wherein said alloy in the final spacer grid comprises a substantial amount of γ' secondary phase particles such that the final spacer grid has a sufficient mechanical strength.

5. A final spacer grid according to claim 4, wherein the mole fraction of γ' secondary phase particles in said alloy in the final spacer grid is 5-25%.

6. A final spacer grid according to claim 1, wherein said outer oxide coating has a thickness of 50-1000 nm.

7. A final spacer grid according to claim 1, wherein the first inner oxide layer has a thickness of 50-200 nm and the second outer oxide layer has a thickness of 20-80 nm.

8. A final spacer grid according to claim 1, wherein said alloy is a Ni base alloy that consists of the following:

| Element | % by weight |
| --- | --- |
| Ni | >60.0 |
| Cr | 14.0-17.0 |
| Fe | 15.0-19.0 |
| Ti | 1.750-2.750 |
| Al | 0.40-1.0 |
| Co | 0.0001-0.0050 |
| C | 0.001-0.050 |
| N | 0.001-0.030 |
| Nb | 0.70-1.20 |
| Ta | 0.001-0.030 |
| Si | 0.01-0.50 |
| Mn | 0.01-1.0 |
| S | 0.001-0.010 |
| P | 0.001-0.020 |
| Cu | 0.01-0.50 |
| Mo + W | 0.001-0.20 |
| the total amount of one or more elements chosen from the group consisting of all elements except for the elements referred to in the table above. | 0-0.50 |

9. A method of manufacturing the final, ready to use, spacer grid comprising the steps of:
providing a Ni base alloy that consists of the following:

| Element | % by weight |
| --- | --- |
| Ni | >50.0 |
| Cr | 14.0-21.0 |
| Fe | 12.0-23.0 |
| Ti | 1.50-3.0 |
| Al | 0.50-1.50 |
| Co | 0.0001-0.010 |
| C | 0.001-0.050 |
| N | 0.001-0.030 |
| Nb | 0.001-1.50 |
| Ta | 0.001-0.030 |
| Si | 0.01-0.50 |
| Mn | 0.01-1.0 |
| S | 0.001-0.020 |
| P | 0.001-0.050 |
| Cu | 0.01-0.50 |
| Mo + W | 0.001-1.0 |
| the total amount of one or more elements chosen from the group consisting of all elements except for the elements referred to in the table above. | 0-1.0 | forming and assembling the alloy such that said spacer grid structure is obtained, and heat treating the spacer grid structure at a temperature of 650-750° C. for 5-23 hours, the heat treatment being performed in an oxidizing atmosphere, wherein the heat treatment is such that an outer oxide coating is formed on the surface of the spacer grid structure comprising a first inner oxide layer of a first composition and a second outer oxide layer of a second composition different from the first composition such that the first inner oxide layer mainly contains $Cr_2O_3$ and the second outer oxide layer mainly contains $NiFe_2O_4$, thereby obtaining the final, ready to use, spacer grid.

10. A method of manufacturing the final spacer grid according claim 9, wherein said oxidizing atmosphere comprises aqueous vapour and air.

11. A method of manufacturing the final spacer grid according to claim 9, wherein said heat treatment of the spacer grid structure is such that γ' secondary phase particles are formed in said alloy, thereby obtaining improved mechanical properties of the final spacer grid.

12. A method of manufacturing the final spacer grid according to claim 11, wherein the mole fraction of γ' secondary phase particles in said alloy in the final spacer grid is 5-25%.

13. A method of manufacturing the final spacer grid according to claim 9, wherein the first inner oxide layer has a thickness of 50-200 nm and the second outer oxide layer has a thickness of 20-80 nm.

* * * * *